(12) United States Patent
Sánchez Segarra et al.

(10) Patent No.: US 9,096,136 B2
(45) Date of Patent: Aug. 4, 2015

(54) SYSTEM FOR FACILITATING THE ELECTRICAL RECHARGING OF A VEHICLE

(76) Inventors: Vicente Manuel Sánchez Segarra, La Vall D'Uixó-Castellón (ES); Maria Dolores Pérez Cardona, La Vall D'Uixó-Castellón (ES)

( * ) Notice: Subject to any disclaimer, the term of this patent is extended or adjusted under 35 U.S.C. 154(b) by 190 days.

(21) Appl. No.: 13/261,430

(22) PCT Filed: Feb. 25, 2011

(86) PCT No.: PCT/ES2011/000059
§ 371 (c)(1),
(2), (4) Date: Sep. 7, 2012

(87) PCT Pub. No.: WO2011/110704
PCT Pub. Date: Sep. 15, 2011

(65) Prior Publication Data
US 2013/0001293 A1    Jan. 3, 2013

(30) Foreign Application Priority Data

Mar. 9, 2010 (ES) .................................. 201030339

(51) Int. Cl.
*G06F 17/00* (2006.01)
*B60L 11/18* (2006.01)
*G07F 15/00* (2006.01)

(52) U.S. Cl.
CPC ......... *B60L 11/1809* (2013.01); *B60L 11/1838* (2013.01); *G07F 15/005* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC ........................... 235/375, 384; 320/101, 107
See application file for complete search history.

(56) References Cited

U.S. PATENT DOCUMENTS

| | | | |
|---|---|---|---|
| 4,532,418 | A | 7/1985 | Meese et al. |
| 2009/0062967 | A1 | 3/2009 | Kressner et al. |
| 2010/0049396 | A1 | 2/2010 | Ferro et al. |

FOREIGN PATENT DOCUMENTS

| | | |
|---|---|---|
| CH | 622 636 | 4/1981 |
| CH | 622 897 | 4/1981 |
| ES | 2 080 756 T3 | 2/1996 |
| GB | 2 178 211 A | 2/1987 |
| WO | WO 2010/009502 | 1/2010 |

*Primary Examiner* — Ahshik Kim
(74) *Attorney, Agent, or Firm* — Breiner & Breiner, L.L.C.

(57) ABSTRACT

System for facilitating the electrical recharging of a vehicle, characterized in that it includes a sealed module. The sealed module is characterized in that it includes a processor that controls the connection and disconnection with an internal communication network of the vehicle. It is also characterized in that any alteration in the electrical charge of the battery of the electric vehicle is captured by the sealed module.

11 Claims, 2 Drawing Sheets

SYSTEM FOR FACILITATING THE ELECTRICAL RECHARGING OF A VEHICLE

BACKGROUND OF THE INVENTION

The invention relates to a system for facilitating the electrical recharging of electric vehicles through the national power grid and within the household sector, even though it can necessarily also be used by carrying out the recharging of the vehicle within industrial sectors that allow the recharging of electric, solar or hybrid vehicles. Its utilization is intended for the taxing of the electric consumption for the recharging of vehicles that utilize electric energy, whether entirely or in part, for their displacement.

BACKGROUND OF THE INVENTION

Patent GB A 2178211 describes a system capable of controlling the on-board access to a rental vehicle or the access to a hotel door by means of a centralized computer system, as well as the payment for such a service with the aid of tokens provided with a programmable memory.

Motor vehicles that travel with the aid of an electric motor require electric recharging, which is necessary for the operation of the motor. Patent EP 0325550 suggests that for utilizing this means of transportation it should be necessary to be in possession of a support card with read-only memory or programmable memory, which could be prepaid or would otherwise have to be subsequently billed by mailing an invoice to the domicile of the user. In order to use the card it is necessary to find a station that possesses available vehicles, which are sufficiently recharged (display on the outside of the vehicle), and subsequently insert the card into the reader located on the outside of the vehicle. If the card is validated, it is then necessary to key in its confidential code, such as with bank cards, into a keypad located beside the reader. Once the code is accepted, the doors or the pivoting roof is unlocked and the "contact" takes place; the vehicle is ready to be driven to a selected destination within the limits of the urban area.

Object of the Invention

One object of the invention is to obtain the improvement of the aforementioned technology and provide a system that facilitates the electric recharging of an electric, solar or hybrid vehicle in which, for example, a taxing entity of the government may deduct the amount of the fees applied to the electric consumption for the recharging incurred as a consequence, in this case, of the use of the charge.

It is an object of the invention to provide a system for facilitating the household electric recharging of an electric vehicle, which can be easily and economically incorporated into the vehicle in which it is to be used.

DESCRIPTION OF THE INVENTION

In order to attain the proposed objects, the system for facilitating the household electric recharging of a vehicle comprises at least:
- a prepayment card or subscriber card provided with a microchip with programmable memory supplied with a cash balance that can be reloaded via banks, credit unions, the Internet or other qualified organizations, etc., in addition to an encrypted security code provided by the public taxing entity;
- a card reader/recorder;
- a conventional module for the control of the vehicle, known as an on-board computer and also designated with the British term Box Service Intelligent or by means of the initials BSI;
- at least one electric battery in an electric vehicle to be recharged from the conventional power grid or from a power source incorporated into the vehicle;
- a sealed and secured module for authorization of the charging or recharging of the battery through the conventional control module of the vehicle;
- and all these connected by making use of the internal communications network of the vehicle itself, in addition to its instruments.

According to the invention, the sealed module for binary communication is conventionally connected via wires to the internal communications network of the vehicle, and consequently to the main BSI module of the vehicle, with the object of enabling or disabling the flow of electric current coming from the conventional power grid or from the power source annexed to the vehicle, such as a solar collector installed in the vehicle, in order to carry out the electric charging of the at least one electric battery in the vehicle, and at the same time securing by means of a microchip card the collection of fees, taxes and costs, which are dependent from the time at which the charging takes place and are derived from the quantity of electric current or consumed energy drawn from the conventional power grid or the power source provided in the vehicle.

The sealed module is programmed to function with actuation protocols of any kind and includes a processor that controls the connection to and disconnection from the communications network of the vehicle, the operability of the system for the authorization of the charging of the electric battery and for the security of the decoding and verification of the data, comprises in addition at least one storage and data overwrite memory or a reprogrammable chip for the storage of software and encryption data and is includes a connection module and a chip with input/output ports in cases where this is necessary.

The wired connection through which the sealed module is connected to the BSI module installed in the vehicle in order to allow recharging of an electric battery during use in the vehicle is a multiplexed network connection. In this way, any electric alteration in the system is immediately detected, interpreted and accepted or rejected by the sealed module in order to allow or prevent the startup of the vehicle.

The main BSI module of the vehicle, to which the sealed module is connected, only allows and controls the flow of electric current from the power grid for the electric charging of the electric battery at the moment at which it receives the recharge admission order from the sealed module, once the prepayment card, which was previously inserted by the user into the card reader/recorder has been read and the reading has been interpreted to be acceptably correct, whereupon the microchip of the prepayment card deducts the cash amount corresponding to the performed charging.

With the startup or ignition of the vehicle and during travel, the sealed module checks periodically the charge status of the electric battery through a network communication maintained with the conventional BSI module, and each status change, or every new status, is recorded in the memory of the sealed module, including the last reading occurred after the last stop of the vehicle.

As mentioned, any alteration of the electric charge of the battery of the electric vehicle is captured by the sealed module, compared to the previously stored charge reading, and validated or rejected for the purpose of allowing or preventing the startup of the vehicle by means of the BSI module; the sealed module controls thus by means of its processor the legal charging obtained by means of the cash withdrawal from the card as well as illegal recharging obtained with its exclusion. In the first possibility, once the card is inserted into the card reader or connected to the sealed module of the conventional internal communications network of the vehicle, the security control of the code mandated by the pertinent administration is processed in the module, which verifies the balance of the card, accepts or rejects the received information, authorizes the BSI module with the acceptance of the legal recharging, whose functions are interrupted in order to allow recharging, and withdraws the amount corresponding to the recharge that was carried out from the financial cost of the card, or otherwise denies the recharging. In the second possibility, and with the startup of the vehicle, the BSI module informs the sealed module about the amount of charge present in the battery and this current charge reading upon startup of the vehicle is compared to the latest previous reading, which was received and stored, for the purpose of determining if the difference is the result of an increment that is proportional to the cost withdrawn from the card in order to allow the startup and setting in motion of the vehicle. In the event that the current battery charge reading upon startup of the vehicle is higher than the previously stored latest reading and the difference is not a result of a proportional increment of the cost withdrawn from the card, or if there has been no cash withdrawal from the card, the sealed module reports to the BSI module about the illegal charging and prevents the startup of the vehicle. The absence of electric current or a connection failure between the sealed module and the BSI caused by the fraudulent extraction of the battery of the vehicle or any other alteration prevents the startup of the vehicle and, if the latter has already been started, prevents another startup after it has been separated.

BRIEF DESCRIPTION OF THE DRAWINGS

For a better understanding of what was explained, the description is accompanied by a set of drawings, in which a preferred and non-limiting embodiment of the system for facilitating the household electric recharging of an electric vehicle, which is the object of the invention, is shown.

EMBODIMENTS OF THE INVENTION

Figure 1:
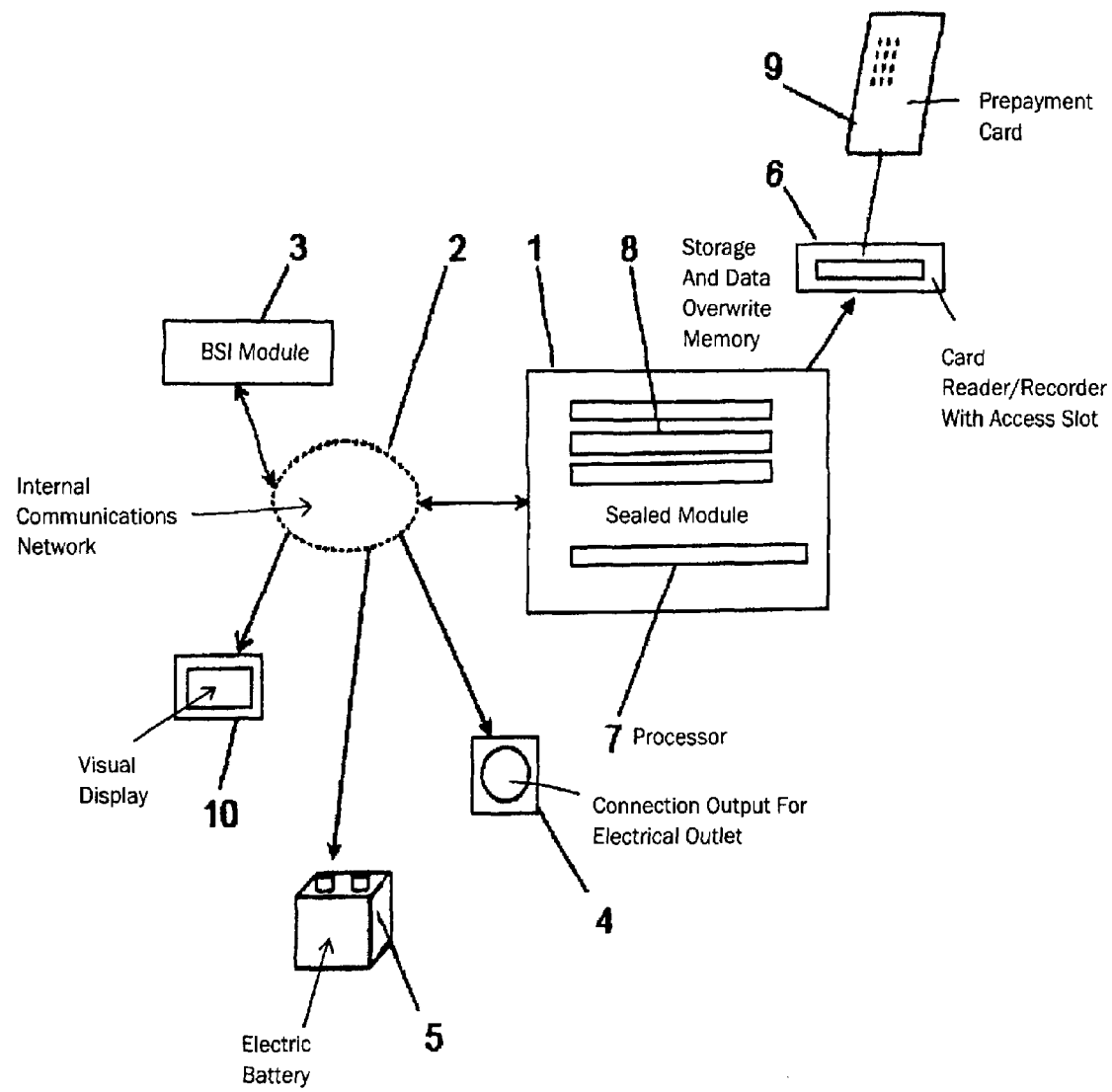
FIG. 1 shows a diagram of the system for facilitating the electric recharging of a vehicle according to the invention. The Figure shows a schematic representation of the sealed module in its relationship with the components of the system, which is to be adapted to a fully or partially electrically powered vehicle.

In FIG. 1, the sealed module (1) can be seen connected to the internal communications network (2), to which are also connected the main module or BSI module (3) of the vehicle, a visual display (10) usually provided with the instruments of the vehicle per se, an electric battery (5), and a connection output for an electrical outlet (4) of the conventional power grid or another source of electric power annexed to the vehicle for the purpose of carrying out the electric recharging of the electric battery (5) of the vehicle.

The sealed module (1) includes the processor (7) and the storage and data overwrite memory (8) utilized for the storage of the software and for the storage of encryption data of the prepayment card (9), which can be seen opposite to the access slot of the card reader/recorder (6).

Figure 2:
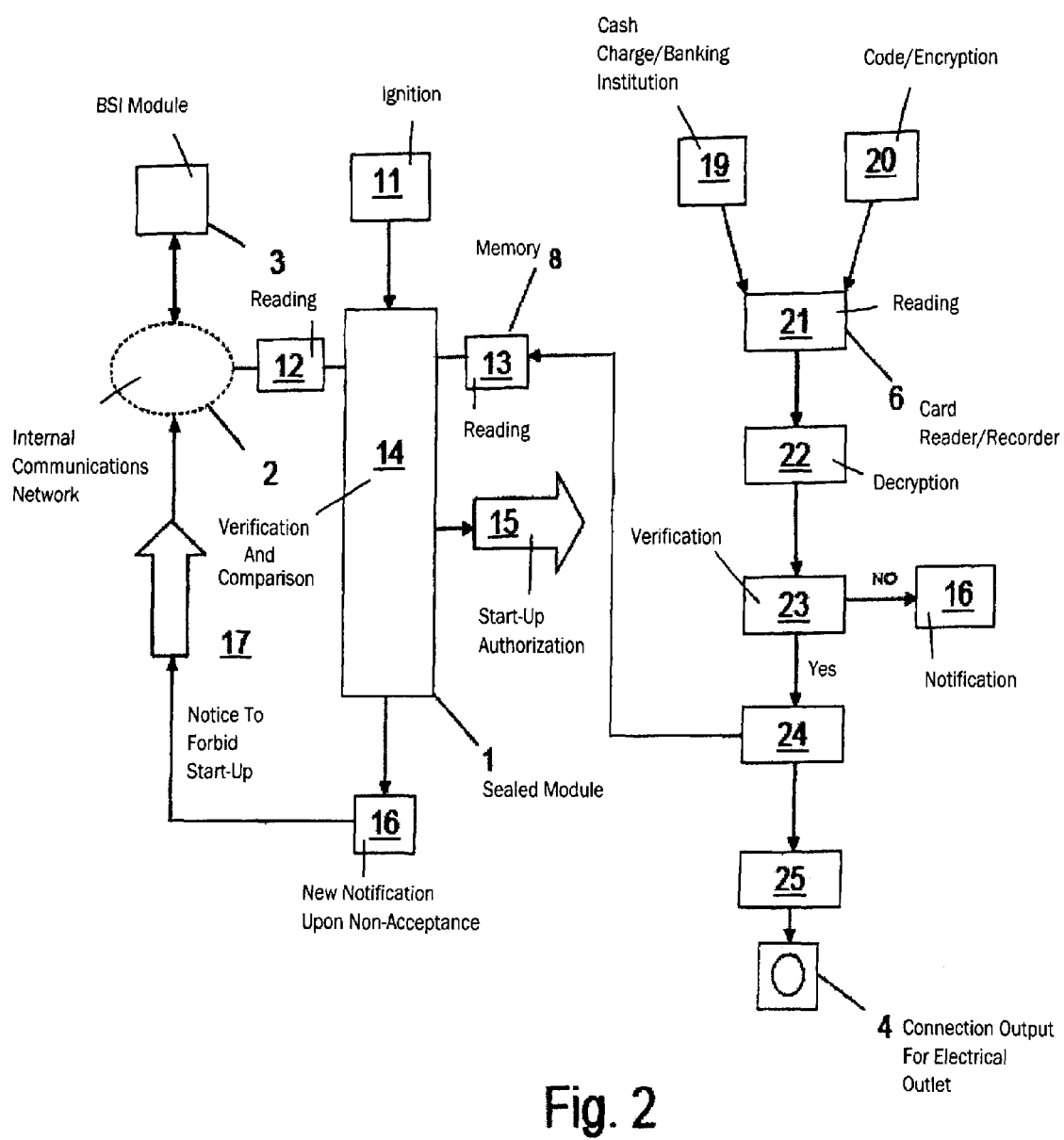
FIG. 2 shows an actuation diagram that illustrates the startup protocol of the vehicle and the authorization protocol for the recharging of the electric battery.

The diagram shown in FIG. 2 indicates the main protocols for actuation of the system. Thus, in a common utilization procedure taken as a non-limiting example, the user provided with the prepayment card (9) with a cash charge (19) authorized by a banking institution (19) and provided with a code or encryption (20) granted by the public government entity, is to insert the prepayment card (9) into the card reader/recorder for its reading (21). The sealed module (1) interprets the information provided by the reader/recorder (6) by means of the processor (7), once the code (20) has been decrypted in (22) and the balance available in the chip of the prepayment card has been verified in (23), and provides a notification (16) to the user, in this example by means of a visual display (10) provided with the instruments of the vehicle per se, concerning the non-acceptance (NO). When the data from the reading of the chip of the prepayment card (9) is considered valid and legal by the sealed module (1), the latter authorizes the connection of the power outlet (4) for the purpose of carrying out the electric charging of the electric battery (5) and stores the latest obtained reading (13) in the memory (8).

The reading of the previously stored charge of the electric battery is then compared to the current reading of the electric battery taken by the BSI module (3) at the time in which the insertion of the key into the ignition of the vehicle takes place. The sealed module (1) authorizes the charging, for example, by authorizing the flow of current from the household power grid to the electric battery. In the further example, the key of the vehicle can also act as prepayment card or vice versa.

The ignition (11) and the startup of the communication network (2) and the BSI module (3) are produced when the ignition key is inserted into the vehicle. The sealed module (1) immediately transmits the reading (12) of the current charge to the electric battery, which current charge (12) is recorded in the history of readings in the overwrite memory (8) of the sealed module (1) once the verification and comparison (14) between the current reading (12) and the latest stored reading (13) has taken place therein. The acceptance of the comparison authorizes the startup (15) of the vehicle. A non-acceptance produces a new notification (16) to the visual display of the vehicle (10) and the BSI module (3) is ordered by means of the internal communications network (2) to forbid (17) startup. The periodic sampling of readings, for example, every 5 seconds, from the history of the storage memory (8) and the comparison between the current reading (12) of the electric charge in the battery (5) makes possible or prevents the startup of the vehicle.

The invention claimed is:

1. A system for facilitating flow of electric current from a power source upon electric recharging of a vehicle comprising
   (a) a sealed module installed in said vehicle,
   (b) a Box Service Intelligent (BSI) module in said vehicle,
   (c) an internal communications network in said vehicle,
   (d) payment means; and
   (e) a reader in said vehicle;
      wherein said sealed module is in operative connection with said BSI module via connection to said internal communications network in the vehicle;
      wherein said payment means is adapted to be coded for reading by the reader and acceptance by said sealed module to provide authorization of electric recharging of an electric battery in said vehicle by a power source annexed to said vehicle, and provision of payment based on an amount of electric current drawn from said power source; and
      wherein said BSI module is adapted to provide electric recharging of said electric battery upon receipt of authorization by said sealed module following acceptance of said payment means.

2. The system according to claim 1, wherein
(a) said sealed module comprises a processor, wherein said processor is adapted to control (1) connection and disconnection with the internal communications network, and (2) said acceptance or non-acceptance of said payment means and thereby operability of said authorization of electric recharging of said electric battery;
(b) security means for encoding and verification of data on said payment means comprising a memory for storage of software and encryption data;
(c) said reader being connected to said sealed module and said BSI module, wherein said reader is adapted to verify data on said payment means so as to allow or disallow recharging of said electric battery.

3. The system according to claim 1, wherein said sealed module is adapted to capture any alteration of electric battery and compare such to a previously stored reading of electric charge, resulting in
(a) said authorization when the electric charge captured is higher than the previously stored reading and is a result of an increment that is proportional to a cost withdrawn from said payment means, or
(b) rejection of said payment means by the reader and prevention of start-up of said vehicle by said BSI module.

4. The system according to claim 2, wherein said sealed module is adapted to capture any alteration of electric battery and compare such to a previously stored reading of electric charge, resulting in
(a) said authorization when the electric charge captured is higher than the previously stored reading and is a result of an increment that is proportional to a cost withdrawn from said payment means, or
(b) rejection of said payment means and prevention of start-up of said vehicle by said BSI module.

5. The system according to claim 1, wherein interruption of connection between said BSI module and/or said sealed module and other components of said system prevents start-up of said vehicle.

6. The system according to claim 2, wherein interruption of connection between said BSI module and/or said sealed module and other components of said system prevents start-up of said vehicle.

7. The system according to claim 3, wherein interruption of connection between said BSI module and/or said sealed module and other components of said system prevents start-up of said vehicle.

8. The system according to claim 1, further including (1) a counter and (2) means for controlling recharging consumption and controlling application of fees.

9. The system according to claim 2, further including (1) a counter and (2) means for controlling recharging consumption and controlling application of fees.

10. The system according to claim 3, further including (1) a counter and (2) means for controlling recharging consumption and controlling application of fees.

11. The system according to claim 5, further including (1) a counter and (2) means for controlling recharging consumption and controlling application of fees.

* * * * *